(12) United States Patent
Matic et al.

(10) Patent No.: US 8,065,707 B1
(45) Date of Patent: Nov. 22, 2011

(54) HDTV SET-TOP BOX/PC CLIENT/SERVER SECURE VIDEO SYSTEM

(75) Inventors: Branislav Matic, Dorval (CA); Goran Matic, Pointe-Claire (CA)

(73) Assignee: Matrox Electronic Systems Ltd., Dorval, Québec (CA)

( * ) Notice: Subject to any disclaimer, the term of this patent is extended or adjusted under 35 U.S.C. 154(b) by 879 days.

(21) Appl. No.: 11/085,065

(22) Filed: Mar. 22, 2005

Related U.S. Application Data (63) Continuation-in-part of application No. 11/026,533, filed on Jan. 3, 2005, now abandoned.

(51) Int. Cl.
*H04N 7/18* (2006.01)
(52) U.S. Cl. ............... 725/80; 725/85; 725/86; 725/100; 345/545
(58) Field of Classification Search ..................... 725/80, 725/85, 86, 100, 131, 139, 152; 345/545
See application file for complete search history.

(56) References Cited

U.S. PATENT DOCUMENTS

| | | | | |
|---|---|---|---|---|
| 7,293,178 B2 * | 11/2007 | Evans et al. | ................. | 713/192 |
| 2003/0188322 A1 * | 10/2003 | Bontempi | ................. | 725/139 |
| 2003/0233660 A1 * | 12/2003 | Slemmer et al. | ................. | 725/80 |
| 2004/0111627 A1 * | 6/2004 | Evans et al. | ................. | 713/189 |
| 2004/0257431 A1 * | 12/2004 | Girish et al. | ................. | 348/14.01 |
| 2004/0263695 A1 * | 12/2004 | Castillo | ................. | 348/731 |
| 2005/0024369 A1 * | 2/2005 | Xie | ................. | 345/547 |
| 2005/0028220 A1 * | 2/2005 | Baer et al. | ................. | 725/131 |
| 2005/0144468 A1 * | 6/2005 | Northcutt et al. | ................. | 713/189 |

* cited by examiner

*Primary Examiner* — Pankaj Kumar
*Assistant Examiner* — Charles N Hicks
(74) *Attorney, Agent, or Firm* — Anglehart et al.

(57) ABSTRACT

A method for providing a combined TV/PC video stream for TV display is provided. A TV video chip having a video input port for receiving a PC monitor display signal and an input for receiving a TV broadcast signal is provided, as well as a PC graphics chip. A PC monitor display signal is sent from the PC graphics chip to the TV video chip. The TV video chip mixing the PC monitor display signal with the TV broadcast signal to generate a combined TV/PC video stream in a format for TV display. A method for generating a combined TV/PC video stream in a format for TV display is further provided. A stream of encoded TV frames is received and the encoded frames are decoded to provide a stream of decoded TV frames. The stream of decoded TV frames is stored into a memory. A PC monitor display signal is provided and is converted into a stream of PC frames. The stream of PC frames are stored into the memory. At least a part of the TV frames and at least a part of the PC frames are read from the memory to output a combined TV/PC video stream and serializing the combined TV/PC video stream, the TV/PC video stream being in a format for TV display.

19 Claims, 10 Drawing Sheets

HDTV SET-TOP BOX/PC CLIENT/SERVER SECURE VIDEO SYSTEM

CROSS-REFERENCE TO RELATED APPLICATIONS

The present application is a Continuation-In-Part of U.S. patent application Ser. No. 11/026,533, filed Jan. 3, 2005, now abandoned, the specification of which is hereby incorporated by reference.

FIELD OF THE INVENTION

The invention relates to the field of multimedia centers. More specifically, it relates to a system and method for providing a combined HDTV Set Top Box and PC graphics video data for combined picture inside picture display onto a HDTV display or a PC display.

BACKGROUND OF THE INVENTION

Convergence of Standard Definition/High Definition Television (SDTV/HDTV) and personal computer (PC) systems is a new promising category of products for emerging home and business multimedia markets.

Generally a HDTV Set Top Box (STB) has the same architecture as a PC specialized for HDTV viewing and uses the same or similar components to the PC, such as I/O devices, a TV tuner, connectors, cables, etc. An STB unit typically contains a TV tuner, a TV video chip containing a microprocessor, MPEG video and audio decoding and processing subsystems, a large high-speed video memory buffer and optionally a hard disk, a LAN interface, extensive I/O, etc.

The STB software architecture is similar to that of a PC with an operating system and a suite of video applications, as well as standard PC applications. A full-function STB unit can also run an operating system (usually Linux™ or Windows CET™), and additional specialized software applications controlling HDTV video and audio functions, etc.

HDTV video is generated from the signal received from a video source (satellite, over the air, cable, DVD, Hard Disk, Internet, etc.) by an HDTV video subsystem in order to generate images on TV screens.

HDTV Copy Protected Video (CPV) content is relatively easy to protect against copying in a closed STB environment by not allowing any user access to decompressed and decrypted HDTV video data. On the other hand, in an open PC environment it is much more difficult to protect against CPV copying. For that reason PC-based HDTV systems are difficult to be certified to receive CPV content over cable.

Both HDTV and PC digital video subsystems have very similar architecture, consisting of a video chip and video memory. While the HDTV and PC video chip each support particular features, they are very similar in overall function.

Users want convergence of PC graphics processing and HDTV graphics processing in a single unit so that PC and TV information can be viewed on a same screen. For example, with the advent of picture-in-picture functionality of TV sets, it is possible to consult statistics and results for a given sports competition, while watching live another sports competition. It would then be desirable that a single unit be able to access the Internet and download the latest statistics and results for the given competition and display them on the same screen on which a TV program is being displayed.

Similarly, PC units connected to the Internet can obtain Electronic TV Program Guide (EPG) data via an EPG web server site. It would be desirable for a user to be able to view the EPG data displayed on an HDTV displaying while watching some other TV programming.

Alternatively, it would be desirable that a user may receive and view a TV program, such as the national news, on a PC monitor display while, simultaneously writing an email or surfing the web in another window on the PC monitor display.

SUMMARY OF THE INVENTION

Accordingly, an object of the present invention is to provide a method and system allowing the combination of HDTV and PC technology enabling simultaneous display on the same screen of HDTV content and PC-based applications.

It is another object of the present invention to provide a multimedia system converging processing of HDTV and PC data in a single solution with superior performance and lower cost than stand-alone STB solutions.

Furthermore, it is another object of the present invention to provide a system and method allowing for data exchange between an HDTV and a PC unit while preventing unauthorized use of copy-protected video content.

According to a first broad aspect of the present invention, there is provided a method for providing a combined TV/PC video stream for TV display, comprising: providing a TV video chip having a video input port for receiving a PC monitor display signal and an input for receiving a TV broadcast signal; providing a PC graphics chip; providing a PC monitor display signal from the PC graphics chip to the TV video chip video memory; the TV video chip mixing the PC monitor display signal with the TV broadcast signal to generate a combined TV/PC video stream in a format for TV display.

According to a second broad aspect of the present invention, there is provided a method for providing a combined TV/PC video stream for PC display, comprising: providing a PC graphics chip having a video input for receiving a TV video signal and an input for receiving a PC graphics signal; providing a TV video chip; providing a TV video signal from the TV video chip to the PC graphics chip; the PC graphics chip mixing the TV video signal and the PC graphics signal to generate a combined TV/PC video stream in a format for PC display.

According to yet another broad aspect of the present invention, there is provided a method for generating a combined TV/PC video stream in a format for TV display, comprising: providing a stream of encoded TV frames; decoding the encoded frames to provide a stream of decoded TV frames; storing the stream of decoded TV frames into a memory; providing a PC monitor display signal; converting the PC monitor display signal into a stream of PC frames; storing the stream of PC frames into the memory; and reading at least a part of the TV frames and at least a part of the PC frames from the memory to generate and output a combined TV/PC video stream and serializing the combined TV/PC video stream, the TV/PC video stream being in a format for TV display.

According to yet another broad aspect of the present invention, there is provided a method for providing a display signal: providing a TV video chip having a video input port for receiving a PC monitor display signal and an input for receiving a TV broadcast signal; providing a PC graphics chip having a video input for receiving a TV video signal and an input for receiving PC graphics signal; providing a PC monitor display signal from the PC graphics chip to the TV video chip; providing a TV video signal from the TV video chip to the PC graphics chip; the TV video chip processing the PC monitor display signal to generate a video stream in a format for TV display; and the PC graphics chip processing the TV video signal to generate a video stream in a format for PC display.

According to yet another broad aspect of the present invention, there is provided a method for asynchronous data exchange between a PC graphics display system and a TV video display system, comprising, the TV video display system receiving a command for initiating a data exchange between the TV video display system and the PC display system; the TV video display system transferring data over a first data bus through a unidirectional access block enabling asynchronous and unidirectional transfer of data; and the PC graphics display system receiving the data over a second data bus from the unidirectional access block.

According to another broad aspect of the present invention, there is provided a system for asynchronous data exchange between a PC graphics chip and a TV video chip, comprising: a PC graphics chip receiving data retrieve commands and in communication with a first data bus connecting the PC graphics chip and a unidirectional access block, the PC graphics chip reading data from the buffer and transferring the data over the data bus; a TV video chip receiving data transfer commands in communication with a second data bus connecting the TV video chip to the unidirectional access block, the TV video chip transferring data to the unidirectional access block; and the unidirectional access block connected to the first data bus through a first bus interface and to a second memory bus through a second bus interface, the unidirectional access block enabling asynchronous and unidirectional writing of data by the TV video chip and reading of data of by the PC graphics chip.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

Figure 1:
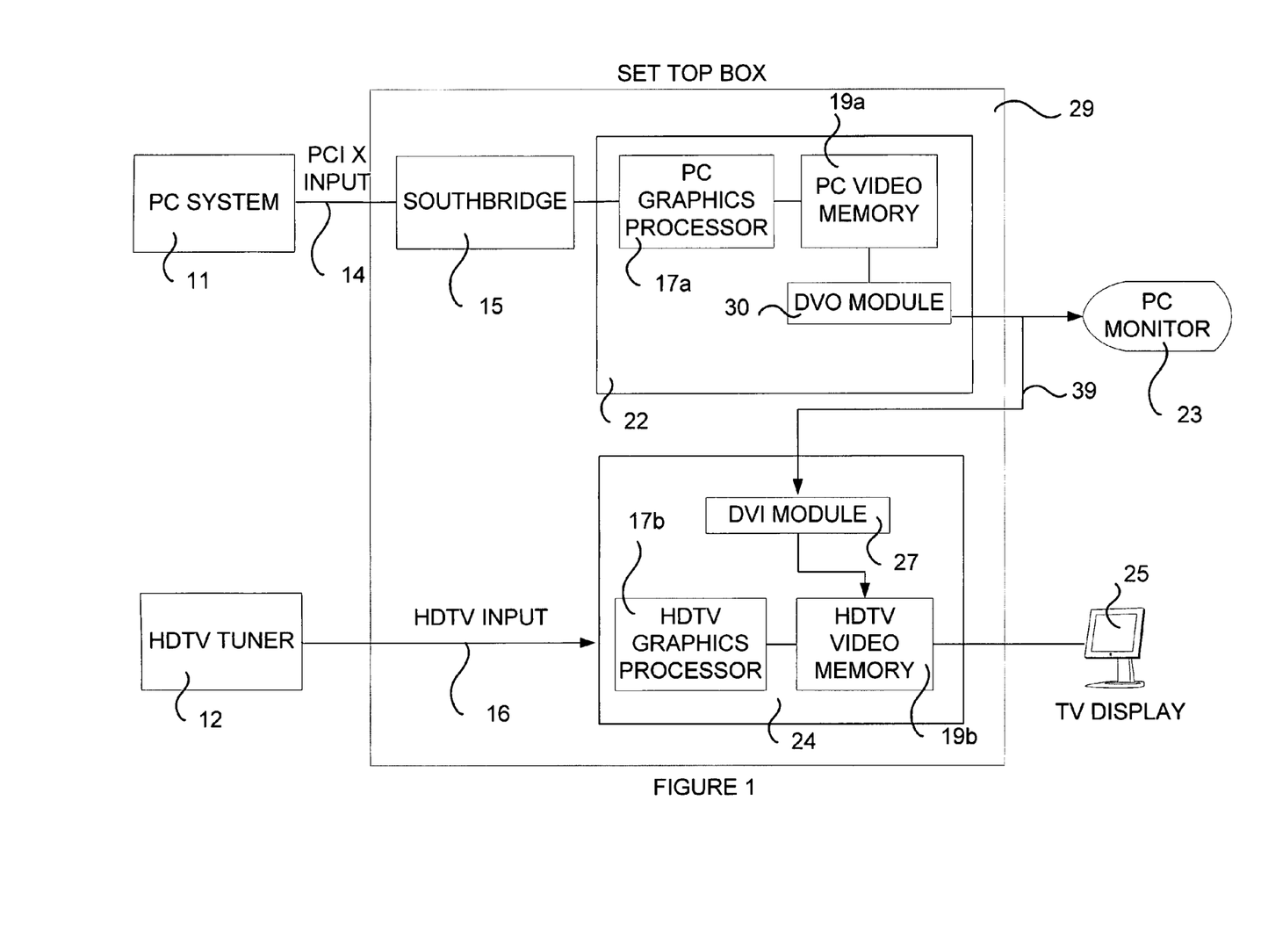
FIG. 1 is a block diagram of a system with a half-butterfly connection for providing a combined TV/PC video stream according to a first embodiment of the present invention.

Referring now to the drawings and more particularly to FIG. 1, shown therein and designated by the reference numeral 29, is a preferred embodiment of a set-top box unit 29 for providing a combined TV/PC video stream, constructed in accordance with the present invention. A PC system 11 is provided having components well-known to those skilled in the art. In the preferred embodiment of the present invention, the PC system includes, for example, a central processing unit (CPU), random access memory (RAM), read-only memory (ROM), as well as various peripheral devices, each connected to a local bus system. Also, coupled to the local bus system are a mass storage device, a keyboard, a pointing device (mouse, trackball, touchpad, etc.), a communication device, etc. The communication device is any device allowing the PC system 11 to communicate with a remotely located PC over a communication link, such as a telephone modem, cable modem, ISDN, etc.

The set-top box unit 29 receives an input 14 over an PCI Express link from a PC system 11. The local bus of the PC system 11 is connected to an expansion bus, such as the PCI Express serial bus. The PCI Express bus is a high speed serial link allowing for low-overhead, low-latency communication between the components connected to it. The PCI Express high speed serial connection between the PC system 11 and the unit 29 can be an electrical connection or an optical connection. In one embodiment of the present invention, the PC system 11 is connected to a DVD player, which would provide a DVD audio/video stream. The DVD audio/video stream would be MPEG-2 encoded and it would be read and decompressed by an MPEG CODEC module in the PC system 11 and an input 14, containing a PC graphics signal, would be provided to the set-top box unit 29.

According to the preferred embodiment of the present invention and as illustrated in FIG. 1, the unit set-top box 29 contains a southbridge module 15 which receives the input 14 sent serially over the PCI Express bus and provides a link to the unit's local PCI bus. On the local PCI bus, video data of the input 14 is transferred to a PC graphics processor 17a, that processes data in a plurality of formats for a plurality of displays. In the preferred embodiment of the present invention, the PC graphics processor 17a is a Matrox graphics chip (Sundog) or equivalent, while the southbridge module 15 is preferably a ULi M1573 chip or equivalent.

The graphics processor 17a can produce several PC graphics video outputs, such as a DVI output or an RGB output, which is sent to a PC monitor 23 for display.

Preferably, the PC monitor display signal 39 is in DVI format, which is a signal protocol using Transition Minimized Differential Signaling (TMDS) to send data. The TMDS link architecture consists of a TMDS transmitter that encodes and serially transmits the data stream over the TMDS link to a TMDS receiver. A TMDS link is composed of three data channels for RGB information.

While in the preferred embodiment of the present invention, the southbridge module 15 and the graphics processor 17a are distinct units communicating through a local PCI bus, it can be appreciated that in alternative embodiments, the southbridge module 15 and the graphics processor 17a could be provided as a single unit or chip, which may optionally include a built-in MPEG decoder.

The video input 14 received is stored in the PC video memory 19a in order to be processed and formatted for display on the PC monitor 23. The PC video memory 19a is in communication with a DVO module 30 which provides a PC display signal 39 to the PC monitor 23.

Still with respect to FIG. 1, a High Definition Television (HDTV) tuner 12 receives broadcast digital television data, including video and audio data. The digital television data may be received over-the-air, through cable or through satellite and is transmitted as an MPEG-2 encoded audio/video stream. Following the HDTV tuner 12 receiving the encoded stream, a descrambler module proceeds to decrypt it according to methods well-known in the art. Furthermore, an MPEG CODEC in either the HDTV tuner 12 or the TV graphics chip 24 will also de-compress the received stream, so that it may be processed and formatted for display.

Alternatively, an analog HDTV signal could be broadcast and received.

The tuner 12 provides a TV signal input 16 to the set-top box unit 29, more precisely to an HDTV graphics processor 17b. The HDTV graphics processor 17b is in communication with an HDTV video memory 19b, in which frames are stored before being output to a display. The HDTV video memory 19b is also in communication with a DV Input (DVI) module 27.

Still with respect to FIG. 1, in a first embodiment of the present invention, the PC graphics chip 22 and the TV graphics chip 24 are connected in a half-butterfly manner, with the PC display signal 39 coming from the DVO module 30 of the PC graphics chip 22 feeding into the DVI module 27 of the TV graphics chip 24.

In the embodiment of FIG. 1, the PC graphics chip 22 preferably has a multiplexer at the output allowing it to drive a plurality of outputs, out of which one output could be a dedicated output for the half-butterfly connection to the TV graphics chip 24, while another output sends a PC graphics signal 39 only to the PC monitor 23.

Alternatively, in the case in which no PC monitor 23 is connected to the set-top box unit 29, the PC graphics chip 22 sends a PC display signal 39 through the half-butterfly connection to be displayed onto the TV display 25 connected to the TV graphics chip 24.

Now, with respect to FIG. 2, a TV video chip 24 having a DVI module 27 for receiving a PC monitor display signal will be described. A PC monitor display signal 39, together with a clock signal, form a DVI signal received at the DVI module 27. The DVI module 27 formats the DVI signal into PC frames. The PC frames are then sent, according to a memory clock signal MCLK, to a video memory 19b to be stored.

At the same time, a decoding module 37 receives encoded TV frames of the HDT input 16, which are decoded and then provided to the same video memory 19b. The video memory 19b therefore stores both TV frames and PC frames.

A video display controller 31 including a scaler/blender unit accesses the video memory 19b. The video display controller 31 is responsible for converting, scaling and combining TV frames and PC frames stored in the video memory 19b. The video memory 19b stores TV frames and PC frames in a display memory 32. The video display controller 31 reads TV frames and PC frames according to instructions received and processes them to produce combined TV/PC frames. The combined PC/TV frames which are ready for display are stored in the frame buffer 34.

Figure 2:
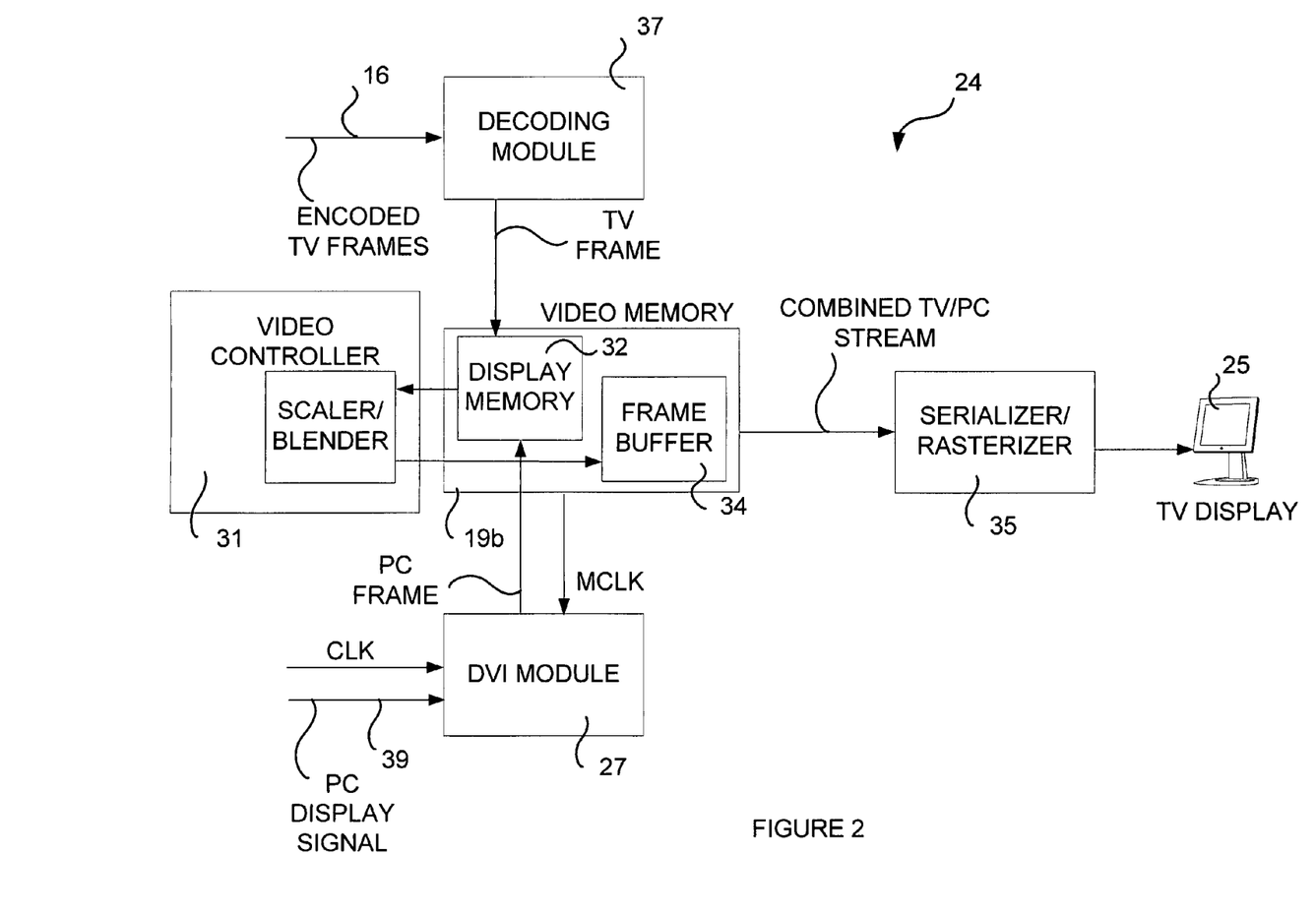
FIG. 2 is a block diagram of a TV video chip for processing a PC display signal and a TV signal in order to produce a combined TV/PC video stream, according to the present invention.

Still with respect to FIG. 2, the combined TV/PC stream read from the frame buffer 34 is received by a serializer/rasterizer unit 35 which formats the combined TV/PC stream such that it may be displayed onto a TV display 25.

Now, with respect to FIG. 3, the processing and conversion of the PC monitor display signal 39 into a stream of PC frames will now be described, as performed by the DVI module 27. The DVI module 27 latches, formats and stores the incoming PC monitor display signal 39. The formatting may include color-space conversion, scaling and/or composite conversion. Formatting is necessary as the PC monitor display signal 39 is in a 4:3 aspect ratio, rather than the usual 16:9 aspect ratio of High Definition MPEG streams. Similarly, the color space of the incoming PC monitor display signal 39 is RGB rather than YPrPb, and the rate of the input data clock 39c is different from the usual SMPTE specifications for HDTV.

The DVI module 27 is able to latch, format and store into memory PC graphics video having a minimum VESA standard resolution of 1024×768 pixels, at 60 Hz. Additionally, the DVI module 27 provides support for a 16:9 ratio resolution of 1280×720 pixels, at 60 Hz. For maximum performance, support for a resolution of 1280×960 pixels is recommended.

Figure 3:
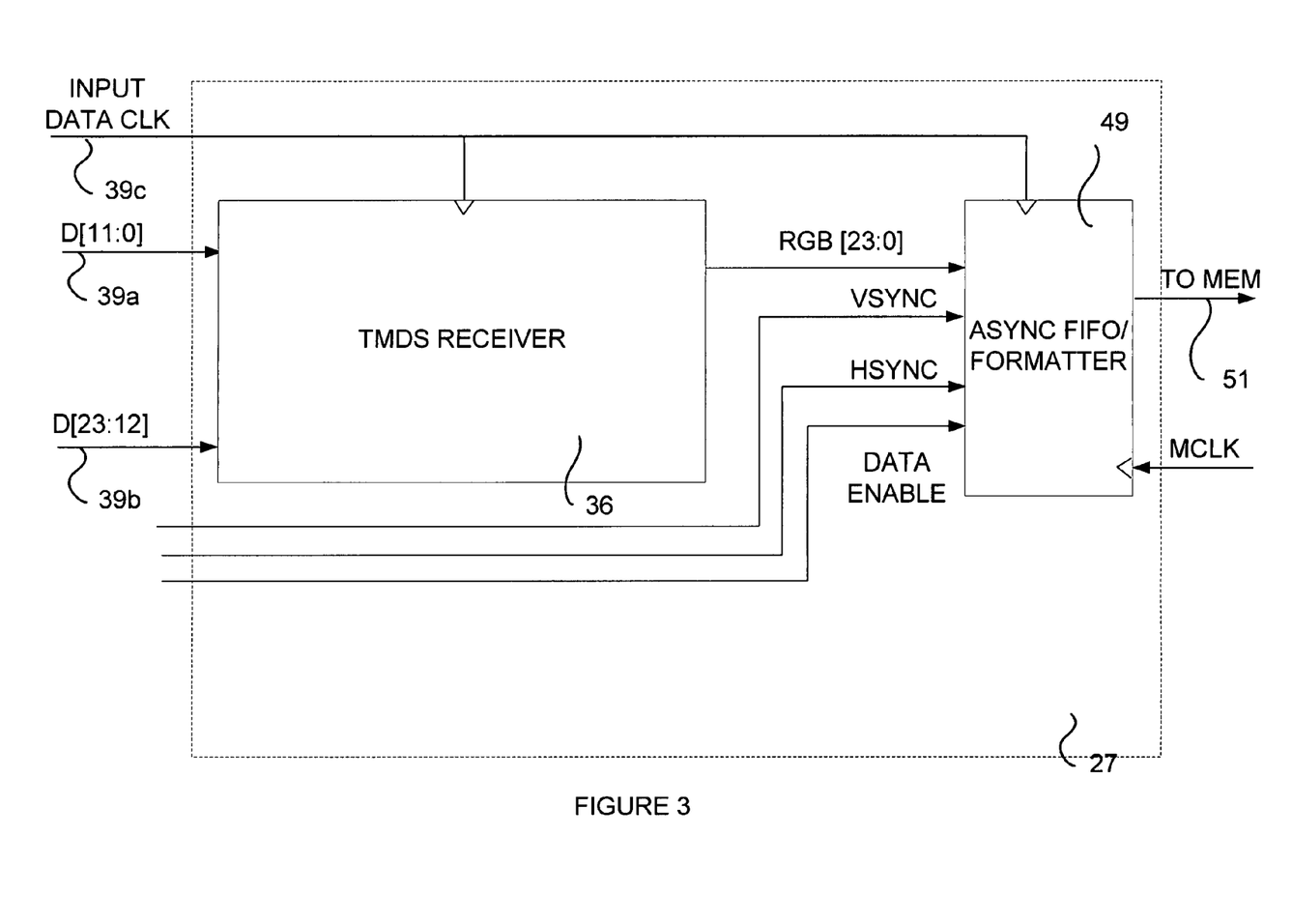
FIG. 3 is a block diagram of a DVI input module according to the present invention.

With respect to FIG. 3, in the preferred embodiment of the present invention, the DVI input module 27 has a high bandwidth raw data capture port. The capture port could either have a 12-bits or a 24-bits wide data bus, mapping directly to pixel data. Data is received in accordance with an input data clock 39c. Tables 1 and 2 below illustrate the data mapping for the 12-bit and the 24-bit mode. In the 12-bit mode, for each of the three channels of the TMDS link, data is received for both the high and low periods of the input data clock 39c to compensate for the reduced bandwidth.

TABLE 1

Logical Interface Options for 12-bit mode

| | P0 | | P1 | | P2 | |
| --- | --- | --- | --- | --- | --- | --- |
| Pin Name | P0L Low | P0H High | P1L Low | P1H High | P2L Low | P2H High |
| D11 | G0[3] | R0[7] | G1[3] | R1[7] | G2[3] | R2[7] |
| D10 | G0[2] | R0[6] | G1[2] | R1[6] | G2[2] | R2[6] |
| D9 | G0[1] | R0[5] | G1[1] | R1[5] | G2[1] | R2[5] |
| D8 | G0[0] | R0[4] | G1[0] | R1[4] | G2[0] | R2[4] |
| D7 | B0[7] | R0[3] | B1[7] | R1[3] | B2[7] | R2[3] |
| D6 | B0[6] | R0[2] | B1[6] | R1[2] | B2[6] | R2[2] |
| D5 | B0[5] | R0[1] | B1[5] | R1[1] | B2[5] | R2[1] |
| D4 | B0[4] | R0[0] | B1[4] | R1[0] | B2[4] | R2[0] |
| D3 | B0[3] | G0[7] | B1[3] | G1[7] | B2[3] | G2[7] |
| D2 | B0[2] | G0[6] | B1[2] | G1[6] | B2[2] | G2[6] |
| D1 | B0[1] | G0[5] | B1[1] | G1[5] | B2[1] | G2[5] |
| D0 | B0[0] | G0[4] | B1[0] | G1[4] | B2[0] | G2[4] |

In the case in which 24-bits data bus is available, the data mapping is as according to Table 2 below.

TABLE 2

Logical Interface Options for 24-bit mode.

| Pin Name | P0 | P1 | P2 |
| --- | --- | --- | --- |
| D23 | R0[7] | R1[7] | R2[7] |
| D22 | R0[6] | R1[6] | R2[6] |
| D21 | R0[5] | R1[5] | R2[5] |
| D20 | R0[4] | R1[4] | R2[4] |
| D19 | R0[3] | R1[3] | R2[3] |
| D18 | R0[2] | R1[2] | R2[2] |
| D17 | R0[1] | R1[1] | R2[1] |
| D16 | R0[0] | R1[0] | R2[0] |
| D15 | G0[7] | G1[7] | G2[7] |
| D14 | G0[6] | G1[6] | G2[6] |
| D13 | G0[5] | G1[5] | G2[5] |

TABLE 2-continued

Logical Interface Options for 24-bit mode.

| Pin Name | P0 | P1 | P2 |
|---|---|---|---|
| D12 | G0[4] | G1[4] | G2[4] |
| D11 | G0[3] | G1[3] | G2[3] |
| D10 | G0[2] | G1[2] | G2[2] |
| D9 | G0[1] | G1[1] | G2[1] |
| D8 | G0[0] | G1[0] | G2[0] |
| D7 | B0[7] | B1[7] | B2[7] |
| D6 | B0[6] | B1[6] | B2[6] |
| D5 | B0[5] | B1[5] | B2[5] |
| D4 | B0[4] | B1[4] | B2[4] |
| D3 | B0[3] | B1[3] | B2[3] |
| D2 | B0[2] | B1[2] | B2[2] |
| D1 | B0[1] | B1[1] | B2[1] |
| D0 | B0[0] | B1[0] | B2[0] |

Still with respect to FIG. 3, the DVI input module 27 includes a TMDS receiver module 36, which receives as inputs the data stream 39a, 39b as well as the input data clock 39c, allowing to sample data at the appropriate bit rate. The TMDS receiver 36 decodes and converts the serial data stream 39a, 39b and outputs a 24-bit RGB signal. The RGB signal, as well as a horizontal sync input control signal and a vertical sync input control signal are fed to an asynchronous FIFO/formatter module 49 which recreates PC frames. The asynchronous FIFO/formatter module 49 stores the recreated PC frames and outputs them to the video memory 19b, in response to the memory clock MCLK. The fact that the FIFO/formatter module 49 is written to and read in accordance with different clock signal inputs allows to solve the synchronization problem between the TV system and the PC system.

In the preferred embodiment of the present invention, the data path between the DVI input module 27 and the video memory 19b is a high speed path, providing data at a minimum frequency of 75 MHz.

Figure 4:
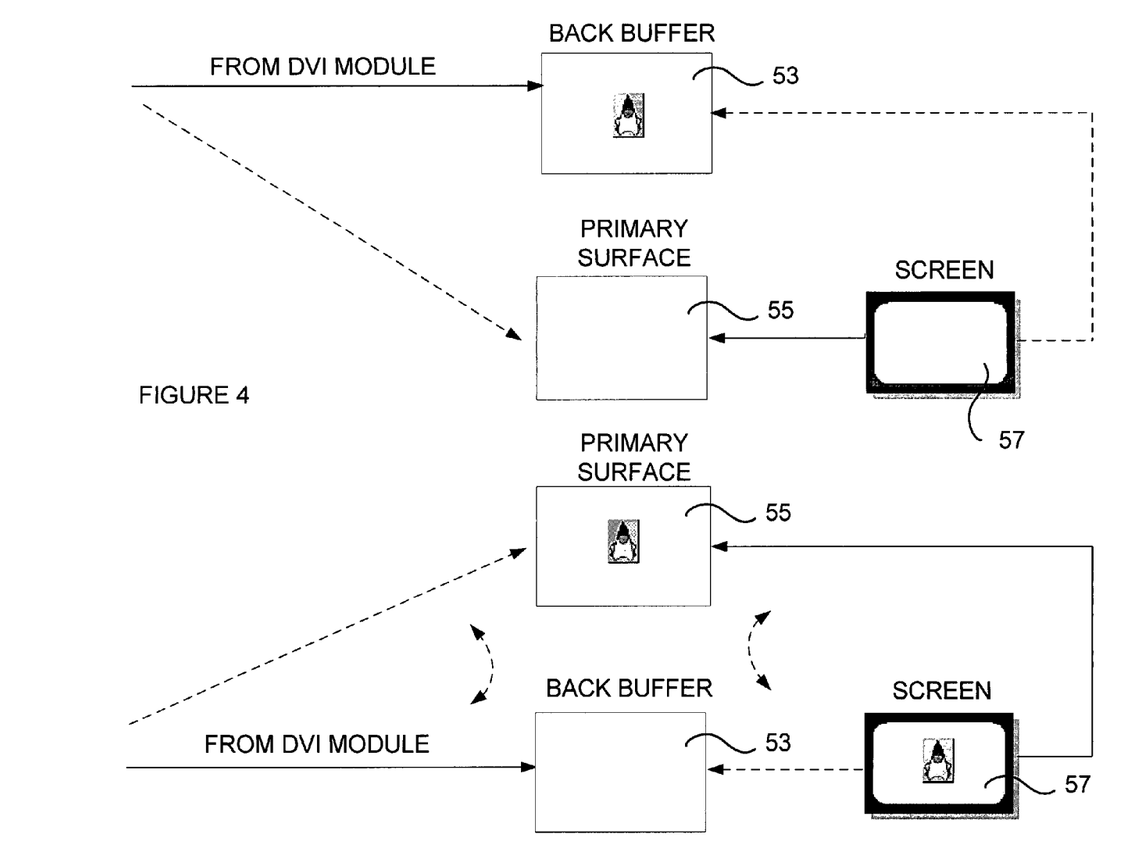
FIG. 4 is a block diagram of the page flipping technique used by the system of the present invention in order to avoid the tearing effect.

Now, with respect to FIG. 4, a page flipping technique used in the preferred embodiment of the present invention will now be described. The page-flipping technique is used in order to avoid the tearing effect. The method requires that the PC frame output by the DVI input module 27 is written to a "back buffer" memory 53, while the display controller reads from a different "primary surface" buffer 55. When a whole frame is stored in the "back buffer" memory 53, the "back buffer" memory 53 and the "primary surface" memory 55 will swap. The use of this technique will not generate any tearing, but it could introduce "frame repeating", in the case in which the display controller clock is faster than the memory clock, or "frame dropping", in the case in which the memory clock is faster than the display controller clock.

Now, with respect to FIG. 2, the TV video chip also includes a color space conversion module, such as a color summation matrix, which converts the PC video stream from RGB format into YPrPb format. In order to support various PC display signals 39, analog RGB signals coming from the PC graphics side can be first converted by a triple 8-bit A/D converter to 3×8 bit RGB digital format and then sent to the DVI input module 27.

Alternatively, a direct bypass path (not shown) could be used in order to display the PC graphics signal 39 directly onto the HDTV screen 25, without further processing by the TV chip 24. In this case, the PC graphics signal 39, sent through the butterfly connection to the TV chip 24, would not be encoded in the DVI format, but would be the pixel stream as output by the serializer/rasterizer unit 35. In this case, the input clock to the DVI input module 27 is the clock of the display controller on the PC graphics chip 22.

Figure 8:
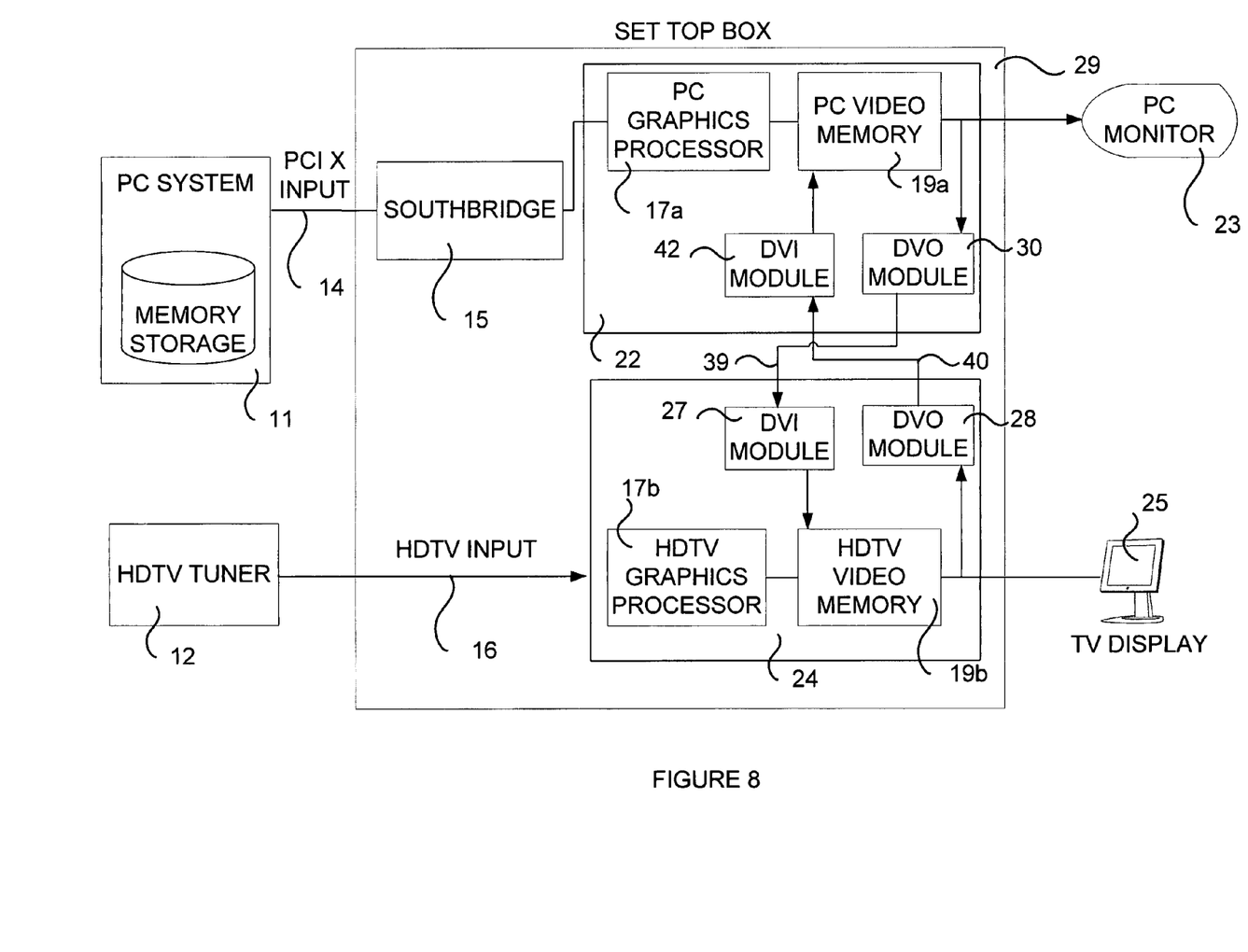
FIG. 8 is a block diagram of a system with a full butterfly connection for providing a combined TV/PC video stream according to a third embodiment of the present invention.

In a third embodiment of the present invention, and with respect to FIG. 8, the PC graphics chip 22 and the TV graphics chip 24 are connected in a full-butterfly manner, with the PC display signal 39 coming from the DVO module 30 of the PC graphics chip 22 feeding into the DVI input module 27 of the TV graphics chip 24, and the TV display signal 40 coming from the DVO module 28 of the TV graphics chip 24 feeding into the DVI module 42 of the PC graphics chip 22.

The TV video signal 40 is sent as an input to the PC graphics chip 22, where it is written to memory to be read and displayed to a PC monitor 23. Similarly to the way in which PC display signals 39 are formatted into PC frames, the TV video signal 40 received at the PC graphics chip 22 is formatted into TV frames and stored into memory 19a. The PC graphics processor 17a reads PC frames and TV frames from the video memory 19a and using blending and/or overlay algorithms, outputs a combined TV/PC video stream which can be displayed onto a PC monitor 23.

With respect to FIG. 9 and in accordance with a fourth embodiment of the present invention, a system for asynchronous data exchange between a PC graphics display system including a PC graphics chip 22 and a TV video display system including a TV video chip 24 will now be described.

The PC graphics chip 22 and the TV video chip 24 of the set-top box unit 29 are connected through a first communication link, including a first data bus, a second data bus and a Unidirectional Access Block (UAB) unit 95. The UAB unit 95 is a buffer allowing asynchronous and unidirectional writing of data by the TV video chip 24 and reading of data by the PC graphics chip 22. Preferably, the UAB unit 95 is implemented as an FPGA circuit. While in the embodiment of FIG. 9, the first and second data buses are PCI buses, in alternative embodiments, data could be exchanged in a similar manner over a LAN connection.

The system provides a way for the PC graphics display system and for the TV video display system to exchange messages, instructions and data. The system can be used to transfer encrypted/decrypted, compressed/decompressed video streams at high speed between the TV video display system and the PC graphics display system for storage/replay for Personal Video Recorder (PVR) applications, DVD replay, processing, etc. The system also provides an additional communication path for message exchange between the PC graphics display system and the TV video display system, instead of, or in addition to, a LAN connection.

Encrypted and compressed copy-protected video data received by the TV video display system can only be played and viewed on the HDTV display 25 since only the TV video display system has the key to decrypt received encrypted compressed video data. However, encrypted video data received by TV video display system can be stored on a PC hard disk of the PC system 11 in the same copy-protected encrypted format as received. Since only the TV video display system has the key required to decrypt the encrypted video data, the PC graphics display system cannot display on either the HDTV display 25 or PC monitor 23 the copy-protected video data stored on the PC hard disk. Nevertheless, the PC graphics display system can still copy, transfer, store, etc. the encrypted copy-protected video data without being able to display it for proper viewing. Whenever requested by a user, the PC system 11 can transfer the encrypted compressed copy-protected video data from its hard disk as a file to the HDTV video display system for replay on an authorized HDTV set.

The UAB unit 95 provides an interface for communication between the TV video display system and the PC graphics video system. Such a configuration could be achieved by providing a PC graphics video board plugged into an STB unit or, alternatively, by building in a PC graphics video board on the same circuit board as the TV video display system.

Figure 9:
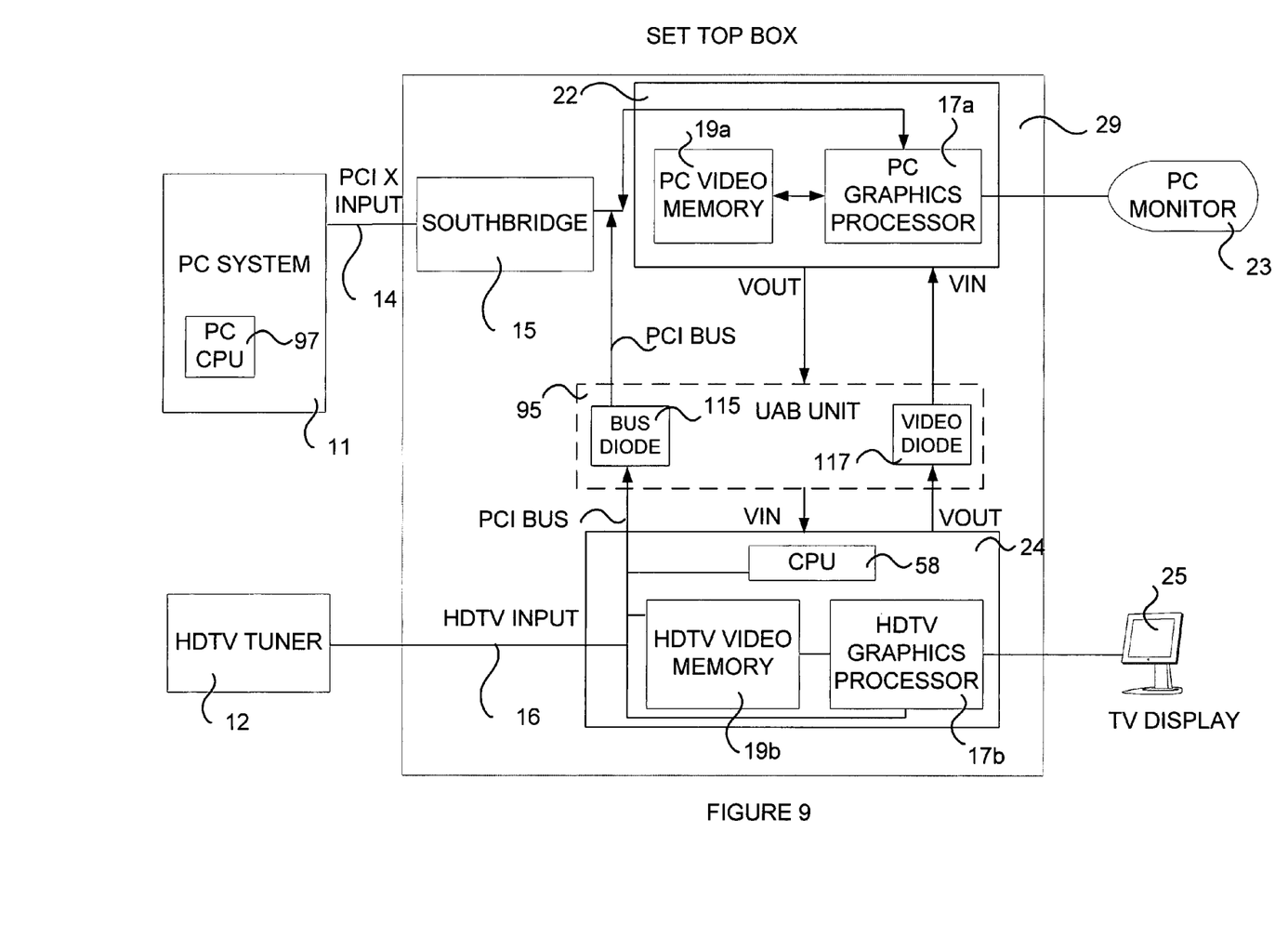
FIG. 9 is a block diagram of a system for providing data exchange between a PC graphics chip and a TV video chip, according to a fourth embodiment of the present invention.
Figure 10:
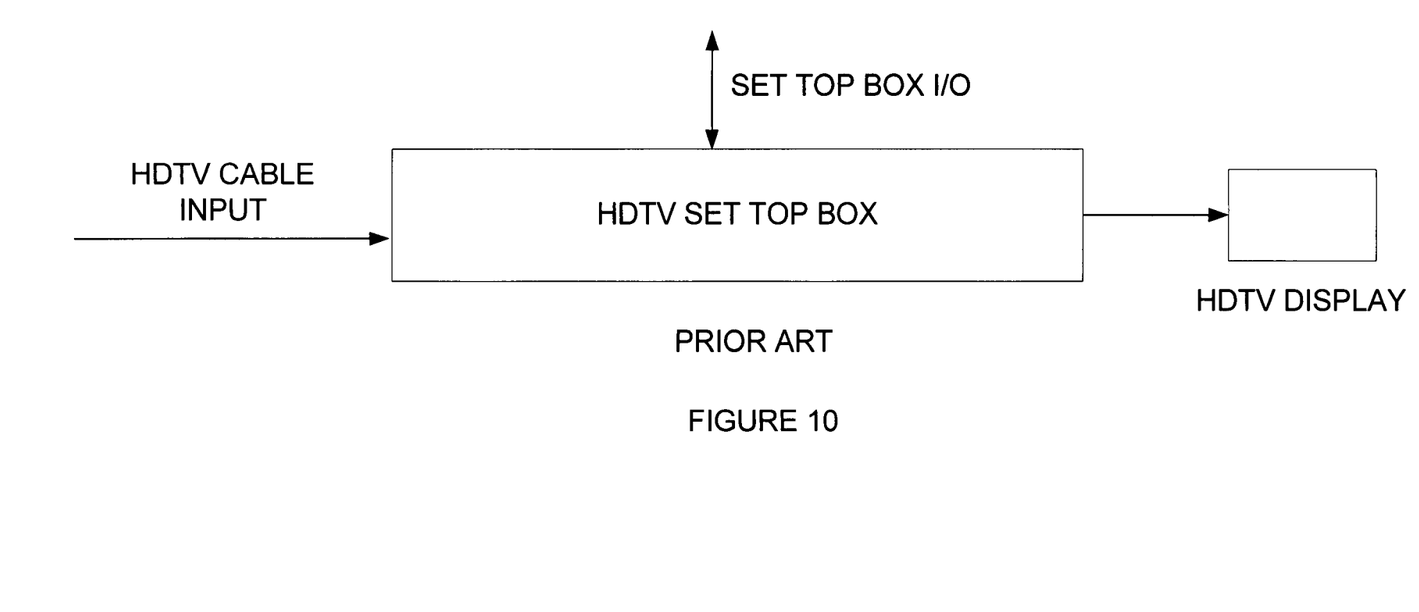
FIG. 10 is a block diagram of a prior art stand-alone set top box for receiving an HDTV cable signal.

As shown in FIG. 9, the PC graphics video output port PC VOUT is connected directly to the TV chip video input port TV VIN in order to enable transfer of a PC monitor display signal from the PC graphics chip to the TV chip and generation of a video stream in a format suitable for TV display.

The TV chip video output port TV VOUT is conditionally ON/OFF connected to the PC graphics video input port PC VIN. The connection is controlled by means of a video diode chip 117, which is under the control of the TV video display system. The TV video display system enables the transfer of TV data from the TV VOUT port to the PC VIN port for data that is not copy-protected, but disables the connection whenever copy-protected decompressed video data is stored in the HDTV video memory 19b. In this manner, copy-protected HDTV video received by the TV video display system can be displayed onto the TV display 25, but it cannot be transferred to the PC video memory 19b and displayed onto the PC monitor 23.

The TV chip 24 can also access directly the PC video memory 19b or the PC system 11 memory (not shown), by means of the PCI bus connection. The PCI bus connection can more generally be used for control and data communications with the PC graphics chip 22 and/or the remote PC CPU 97.

The PCI bus on the TV video display system side and the PCI bus on the PC graphics video system side communicate through a unidirectional bus control circuit, shown as a bus diode 115 chip in FIG. 9. The bus diode 115 chip allows the TV chip 24 to access the PCI bus on the PC graphics video system side, but it prevents the PC graphics chip 22 from accessing the TV PCI bus.

The configuration allowing for the direct connection between the TV video display system and the PC graphics video system can be used in conjunction with the Microsoft Windows Media Digital Rights Management (DRM) protocol, enabling content providers to protect content and maintain control over the distribution of digital media files. Copy-protected encrypted and compressed data received by the TV chip 24 is first decrypted and decompressed by the CPU 58 in accordance to cable TV protocol and certification requirements and then compressed and encrypted again according to Windows Media DRM standards. Once it has been compressed and encrypted using cryptographic and anti-piracy algorithms provided by the Windows Media Rights Manager, the data can be transferred to the PC graphics video memory 19a or to the PC system 11 memory through the PCI bus connection for PC storage and processing according to DRM standards.

Similarly, DRM encrypted and compressed video data stored in PC system 11 memory can be sent by the PC CPU 97 to the PC video memory 19a via a PCI-X connection. The data can then be read by the TV CPU 58, which has access to the PC video memory 19a, and decrypted and decompressed in order to be displayed onto the TV display 25.

In a first configuration, the UAB unit 95 is connected between a first data bus and a second data bus in order to prevent the PC CPU 97 from directly accessing data in the HDTV video memory 19b, but to allow CPU 58 full-access to the PC video memory 19a. As explained above, this is required in order to prevent the PC CPU 97 from unauthorized copying of decompressed decrypted copy-protected HDTV content stored in the STB HDTV memory 19b. In this configuration, the TV video chip 24 of the TV video display system receives a data transfer command to transfer data to the PC graphics display system. The data transfer command could be initiated by the CPU 58 or it could be a command received from the PC graphics display system.

The PC graphics chip 22 is connected through a second data bus and through an interface to the UAB unit 95. Similarly, on the TV video display system side, a CPU 58 connected to the local bus of the TV video chip 24, communicates with the UAB unit 95 through a first data bus and through an interface to the UAB unit 95.

The data to be transferred could be, for a example, a compressed and encrypted HDTV movie received over cable by the TV video display system. The data is transferred over the first data bus to the UAB unit 95 where if the data is not copy-protected, the TV video chip 24 has enabled, through the bus chip 115, communication with the second data bus. When transferring the data to the UAB unit 95, the TV video display system might include a message for the PC CPU to read the data and store it on a PC system hard disk.

The PC CPU 97 receives the message and stores the compressed encrypted HDTV accordingly on the PC system hard disk. The PC graphics display system can then read the movie from the hard disk and transfer it to the PC video memory 19a without decrypting it. Once the HDTV movie is stored in the PC video memory 19a, the CPU 58 of the TV video display system can read it and transfer it to HDTV video memory 19b and using decrypting algorithms, decrypt and decompress it in order to be played back on the TV display 25.

Alternatively, when transferring the data to the UAB unit 95, the TV video display system might include a message for the PC CPU 97 to read the data and store it directly into PC video memory 19a. In another embodiment, the UAB unit 95 could be configured to send all data received from the TV video display system into the PC video memory 19a without the need for the TV video display system to send a command.

In one possible embodiment, the TV video display system and the PC graphics video system function in a master-slave configuration, with the PC graphics video system receiving and executing commands from the TV video display system. In such a configuration, the data could be read and transferred from the UAB unit 95 by the PC graphics chip 22 after receiving a command from the TV video display system.

In an alternative embodiment, the two systems could function independently and each side, upon receiving a command or a request would evaluate how to respond. In such an embodiment, the PC CPU 97, located remotely, sends commands for reading data from the UAB unit 95 after being notified that data is available to be read. While in the embodiment shown in FIG. 9, the PC CPU 97 is located remotely, and sends commands to the PC graphics chip 22 over a PCI-X link, in other embodiments, the PC CPU 97 could be local and be connected directly to the local bus of the PC graphics chip 22.

In one embodiment of the present invention, the data exchanged could be a TV display signal 40, which, once received at the PC graphics chip 22, is sent over the PCI link to the PC system 11 to be converted into an MPEG format and stored on the memory storage device, such as a hard disk. Preferably, the TV video chip 24 includes an MPEG CODEC unit such that the PC graphics chip 22 can retrieve MPEG-encoded TV data stored on the memory storage device of the PC system 11 and send it to the TV video chip 24 to be decoded and then formatted for display onto the HDTV screen 25.

Optionally, whenever the TV video display system receives a request for a data exchange, the TV video display will determine whether the data is copyright protected. If the data is protected by copyright and it is not encrypted, then the TV video display system will send a refusal message to the PC display system. If the data is not protected by copyright, or if the data is encrypted such that it cannot be read and displayed by the PC graphics display system, the TV video system will execute the data exchange through the unidirectional bus path provided by the UAB unit 95.

According to another embodiment of the present invention, the UAB unit 95 could be configured such as to provide a second communication path between the PC graphics chip 22 and the TV video chip 24 allowing for unidirectional and asynchronous exchange of data from the PC graphics chip 22 to the TV video chip 24. The data exchange through the second communication path is similar to the one already described for the case in which the TV video display system transfers data to the PC graphics display system. The PC graphics display system receives a command for initiating a data exchange and starts transferring data over the second data bus through the UAB unit 95 to the first data bus, to the TV video display system.

Figure 5:
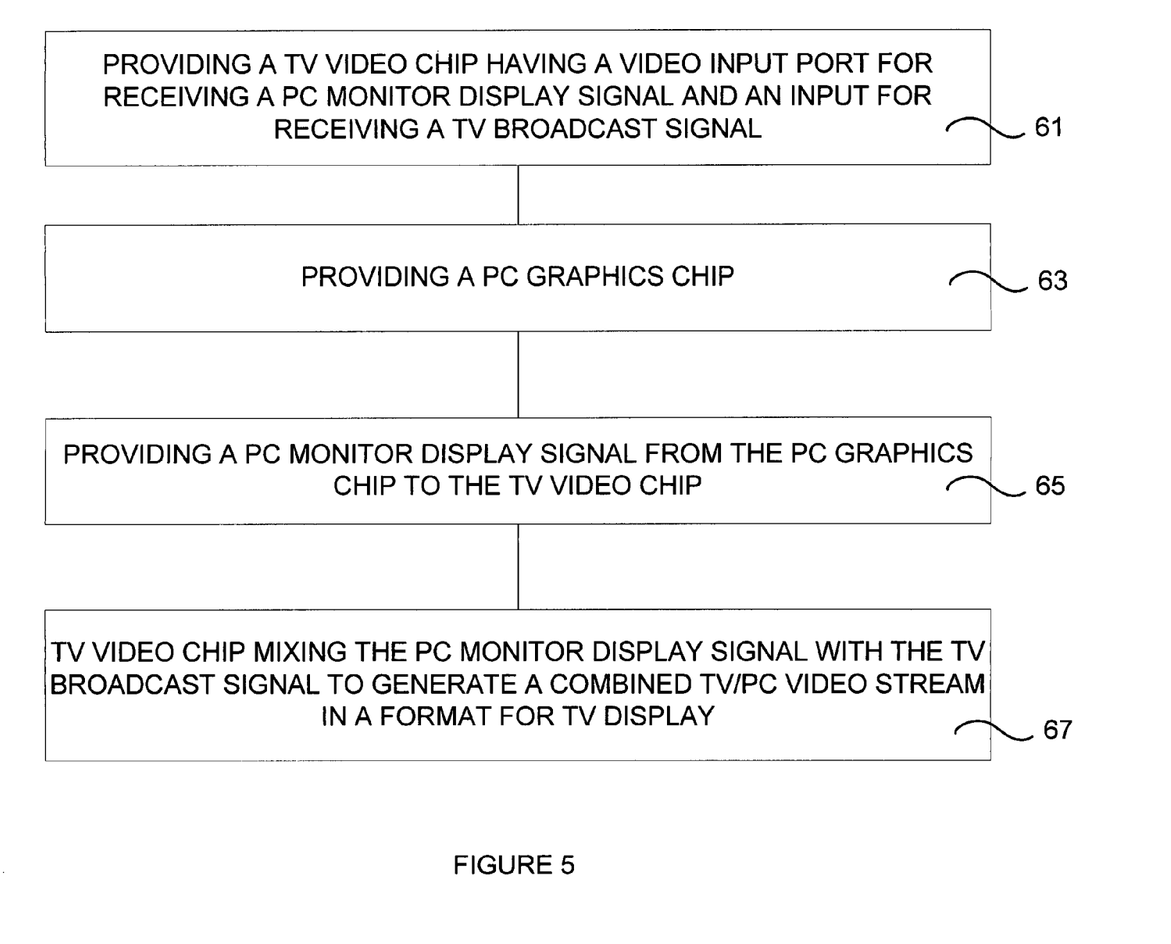
FIG. 5 is a flow chart of a method for providing a combined TV/PC video stream for TV display according to the first embodiment of the present invention.

With respect to FIG. 1 and FIG. 5 and in accordance with a first embodiment of the present invention, a method for providing a TV/PC video stream for TV display will now be described. In a first step 61, a TV video chip 24 is provided, having a video input port 27 for receiving a PC monitor display signal 39 and an input for receiving a TV broadcast signal 16. In a next step 63, a PC graphics chip 22 is provided. Then, in step 65, a PC monitor display signal 39 is provided from the PC graphics chip 22 to the TV video chip 24. In the last step 67, the TV video chip 24 mixes the PC monitor display signal 39 to generate a combined TV/PC video stream in a format for TV display.

Figure 6:
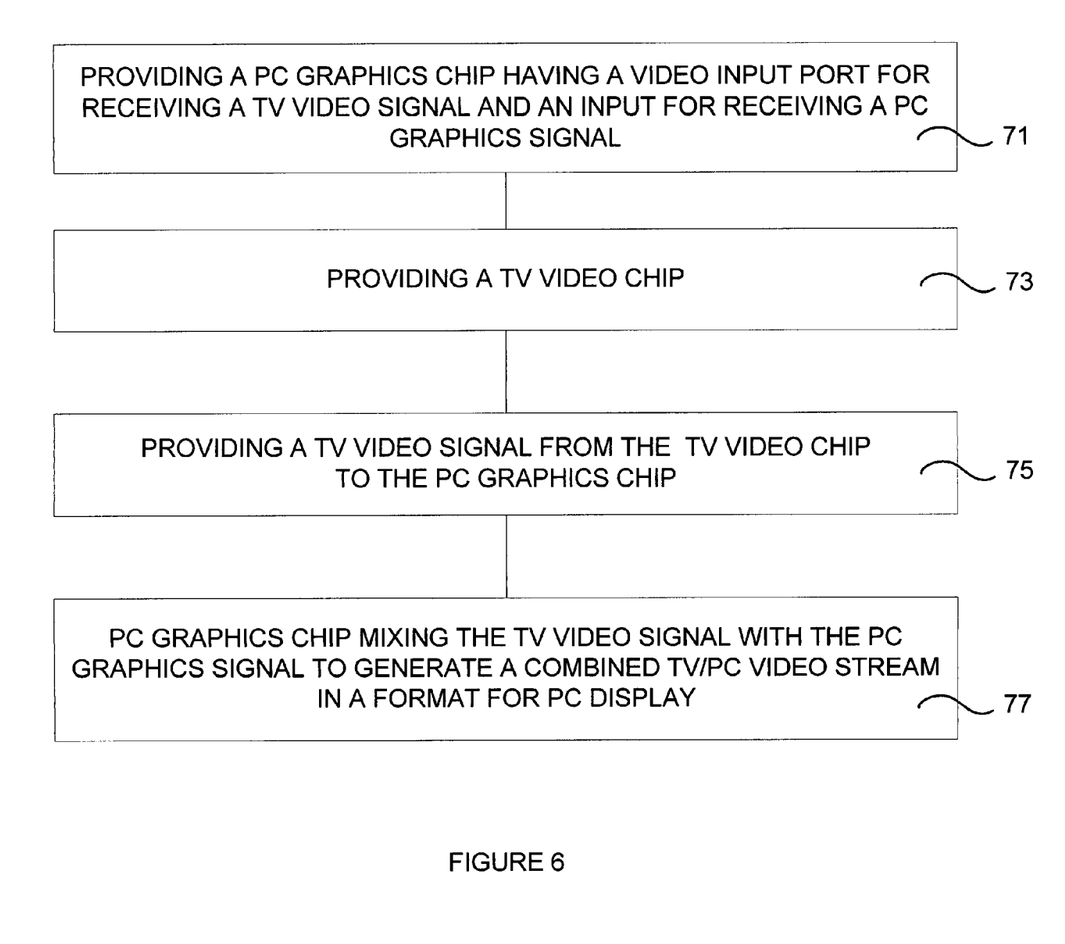
FIG. 6 is a flow chart of a method for providing a combined TV/PC video stream for PC display according to the second embodiment of the present invention.

With respect to FIG. 6 and in accordance with a second embodiment of the present invention, a method for providing a TV/PC video stream for PC display will now be described. In a first step 71, a PC graphics chip 22 is provided having a video input for receiving a TV video signal 40 and an input for receiving a PC graphics signal 14. In a next step 73, a TV video chip 24 is provided. In step 75, a TV video signal 40 is sent from the TV video chip to the PC graphics chip 22. In a last step 75, the PC graphics chip 22 mixes the TV video signal 40 and the PC graphics signal 14 to generate a combined TV/PC video stream in a format for PC display.

Figure 7:
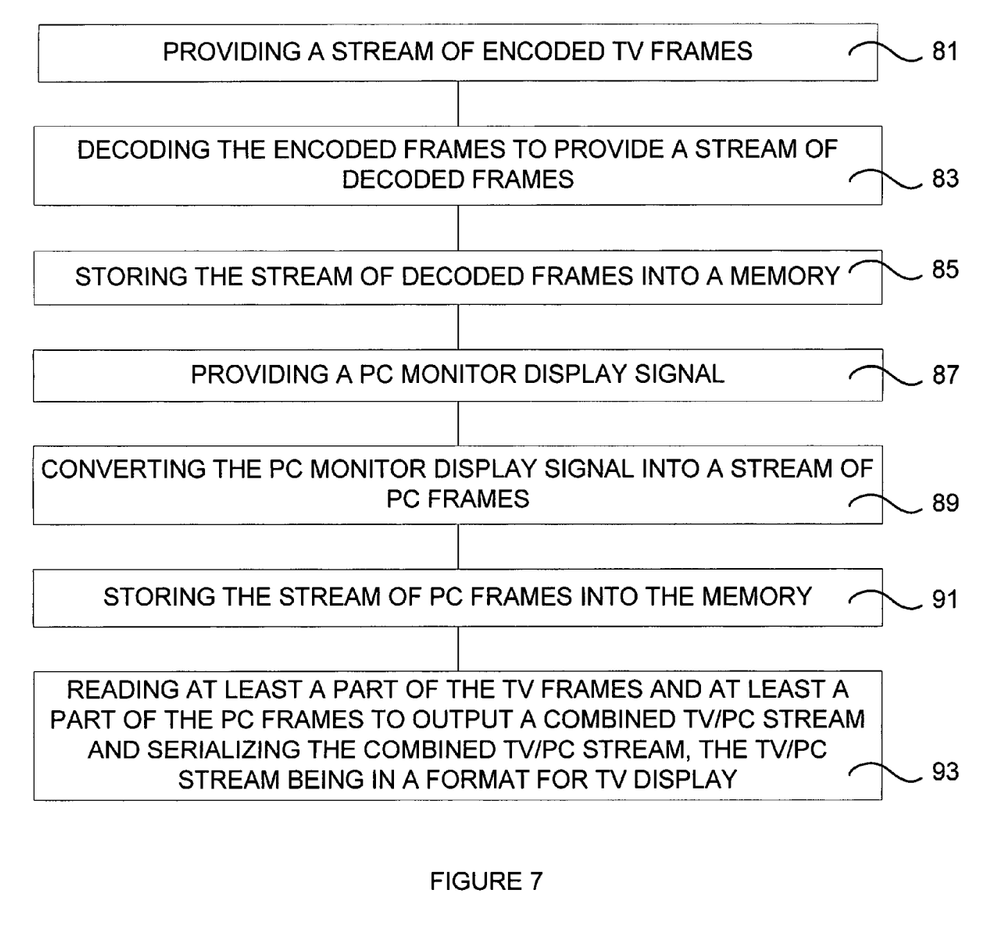
FIG. 7 is a flow chart of a method for generating a combined TV/PC video stream in a format for TV display according to the present invention.

Now, with respect to FIG. 2 and FIG. 7, a method for generating a TV/PC video stream in a format for TV display will be described. In a first step 81, a stream of encoded TV frames 16 is provided. Then, in step 83, the encoded frames are decoded to provide a stream of decoded TV frames. In step 85, the decoded TV frames are stored into a memory 19*b*. In step 87, a PC monitor display signal 39 is provided. In step 89, the PC monitor display signal 39 is converted into a stream of PC frames. The PC frames are stored into a memory 19*b* in step 91. Then, in step 93, at least a part of the TV frames and at least a part of the PC frames is read from the memory 19*b* to output a combined TV/PC video stream in a format for TV display, and serializing the combined TV/PC video stream.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A method for providing a combined TV/PC video stream for PC display, comprising:
   providing a PC graphics chip having a video input port for receiving TV video signals and an input for receiving PC graphics signals;
   providing a TV video chip having a video output port for transmitting TV video signals and an input for receiving TV broadcast signals;
   providing a TV video signal from said TV video chip to said PC graphics chip via a conditional connection between said video output port of said TV video chip and said video input port of said PC graphics chip, said connection controlled by a unidirectional access block interfacing between said TV video chip and said PC graphics chip, said unidirectional access block being operative to controllably enable or disable said connection;
   mixing in said PC graphics chip said received TV video signal and a received PC graphics signal to generate a combined TV/PC video stream in a format for PC display;
   causing said unidirectional access block to disable said connection when a TV broadcast signal received by said TV video chip is determined to include copy protected data, thereby preventing said PC graphics chip from receiving said TV video signal from said TV video chip such that the copy protected data cannot be transferred from said TV video chip to said PC graphics chip.

2. A method as claimed in claim 1, wherein said unidirectional access block includes a video diode chip controlling said connection between said video output port of said TV video chip and said video input port of said PC graphics chip.

3. A method as claimed in claim 1, wherein said TV video chip and said PC graphics chip are installed on the same printed circuit board.

4. A method for providing a display signal, said method comprising:
   providing a TV video chip having a video input port for receiving PC monitor display signals, a video output port for transmitting TV video signals and an input for receiving TV broadcast signals;
   providing a PC graphics chip having a video input port for receiving TV video signals a video output port for transmitting PC monitor display signals and an input for receiving PC graphics signals;
   providing a PC monitor display signal from said PC graphics chip to said TV video chip via a direct first connection between said video output port of said PC graphics chip and said video input port of said TV video chip;
   processing in said TV video chip said PC monitor display signal to generate a video stream in a format for TV display;
   providing a TV video signal from said TV video chip to said PC graphics chip via a conditional second connection between said video output port of said TV video chip and said video input port of said PC graphics chip, said second connection controlled by a unidirectional access block interfacing between said TV video chip and said PC graphics chip, said unidirectional access block being operative to controllably enable or disable said second connection;
   processing in said PC graphics chip said TV video signal to generate a video stream in a format for PC display;

causing said unidirectional access block to controllably disable said second connection when a TV broadcast signal received by said TV video chip is determined to include copy protected data, thereby preventing said PC graphics chip from receiving said TV video signal from said TV video chip such that the copy protected data cannot be transferred from said TV video chip to said PC graphics chip.

5. A method as claimed in claim 4, further comprising:
mixing in said TV video chip said PC monitor display signal with a received TV broadcast signal to generate a combined TV/PC video stream in a format for TV display.

6. A method as claimed in claim 5, further comprising:
mixing in said PC graphics chip said TV video signal and a received PC graphics signal to generate a combined TV/PC video stream in a format for PC display.

7. A method for asynchronous data exchange between a TV video display system and a PC graphics display system, each of the TV video display system and the PC graphics display system having a respective video memory, said method comprising:
providing a unidirectional access block adapted to interface between said TV video display system and said PC graphics display system;
providing a first data bus connecting said TV video display system and said unidirectional access block, said TV video display system being operative to transfer data over said first data bus to said unidirectional access block;
providing a second data bus connecting said PC graphics display system and said unidirectional access block, said PC graphics display system being operative to receive data over said second data bus from said unidirectional access block;
initiating a data exchange between said TV video display system and said PC graphics display system via said unidirectional access block, said unidirectional access block enabling asynchronous and unidirectional transfer of data during said data exchange;
said unidirectional access block allowing said TV video display system to access said second bus and thus data stored in the video memory of said PC graphics display system, while preventing said PC graphics display system from accessing said first bus and thus data stored in the video memory of said TV video display system.

8. A method as claimed in claim 7, wherein said PC graphics display system receives data over said second data bus, said method further comprises said PC graphics display system transferring and writing said data to a hard disk.

9. A method as claimed in claim 8, further comprising:
said TV video display system sending a command to said PC graphics display system to retrieve said data from said hard disk;
said PC graphics display system reading said stored data and transferring said stored data to the video memory of the PC graphics display system;
said TV video display system reading said data from the video memory of the PC graphics display system.

10. A method as claimed in claim 7, wherein when said data to be exchanged via said unidirectional access block is to be sent from said TV video display system to said PC graphics display system, said method further comprises:
determining whether said data to be exchanged is copy protected;
if said data is not copy protected, executing said data exchange;
if said data is copy-protected and is not encrypted, sending a refusal message to said PC display system.

11. A method as claimed in claim 7, wherein the video memory of said PC graphics display system stores PC frames, said method further comprising said PC graphics display system storing data received from said TV video display system in the video memory of said PC graphics display system, and mixing said received data with said PC frames to generate a combined TV/PC video stream in a format for PC display.

12. A system for asynchronous data exchange between a PC graphics chip and a TV video chip, comprising:
a PC graphics chip associated with a PC video memory, said PC graphics chip receiving data retrieve commands and in communication with a first data bus connecting said PC graphics chip and a unidirectional access block, said PC graphics chip reading data from said unidirectional access block and transferring said data over said first data bus;
a TV video chip associated with a TV video memory, said TV video chip receiving data transfer commands and in communication with a second data bus connecting said TV video chip to said unidirectional access block, said TV video chip transferring data to said unidirectional access block over said second data bus;
said unidirectional access block connected to said first data bus through a first bus interface and to said second data bus through a second bus interface, said unidirectional access block enabling asynchronous and unidirectional transfer of data between said TV video chip and said PC graphics chip, said unidirectional access block allowing said TV video chip to access said first data bus and thus data stored in said PC video memory, while preventing said PC graphics chip from accessing said second data bus and thus data stored in said TV video memory.

13. A system as claimed in claim 12, wherein said first data bus and said second data bus are PCI buses.

14. A system as claimed in claim 12, wherein said data transferred from said TV graphics chip to said PC graphics chip is a TV signal data.

15. A system for data exchange between a PC graphics chip and a TV video chip, said system comprising:
a TV video chip having a video output port for transmitting TV video signals;
a PC graphics chip having a video input port for receiving TV video signals and an input for receiving PC graphics signals;
a conditional connection between said video output port of said TV video chip and said video input port of said PC graphics chip, said connection controlled by a unidirectional access block interfacing between said TV video chip and said PC graphics chip, said unidirectional access block being operative to controllably enable or disable said connection;
said PC graphics chip being operative to mix received TV video signals and received PC graphics signals to generate a combined TV/PC video stream in a format for PC display;
said unidirectional access block adapted to controllably disable said connection when a TV video signal in said TV video chip is determined to include copy protected data, thereby preventing said PC graphics chip from receiving said TV video signal from said TV video chip over said connection such that the copy protected data cannot be transferred from said TV video chip to said PC graphics chip.

16. A system as defined in claim 12, wherein said TV video chip has an input for receiving TV broadcast signals and a video output port for transmitting TV video signals, said PC graphics chip has a video input port for receiving TV video signals and an input for receiving PC graphics signals, said PC graphics chip operative to mix a received TV video signal and a received PC graphics signal to generate a combined TV/PC video stream in a format for PC display.

17. A system as defined in claim 16, wherein said system further comprises a conditional connection between said video output port of said TV video chip and said video input port of said PC graphics chip via said unidirectional access block, said unidirectional access block capable to controllably enable or disable said connection.

18. A system as defined in claim 17, wherein said unidirectional access block disables said connection when a TV broadcast signal received by said TV video chip is determined to include copy protected data, thereby preventing said PC graphics chip from receiving a TV video signal from said TV video chip over said connection such that the copy protected data cannot be transferred from said TV video chip to said PC graphics chip.

19. A system as defined in claim 18, wherein said unidirectional access block includes a video diode chip controlling said connection between said video output port of said TV video chip and said video input port of said PC graphics chip.

* * * * *